United States Patent Office 3,293,262
Patented Dec. 20, 1966

3,293,262
PROCESS FOR THE PRODUCTION OF HIGHLY
HALOGENATED COPPER PHTHALOCYANINES
André Pugin, Riehen, Switzerland, assignor to
J. R. Geigy A.-G., Basel, Switzerland
No Drawing. Filed Feb. 28, 1964, Ser. No. 348,275
Claims priority, application Switzerland, Mar. 13, 1963,
3,170/63
12 Claims. (Cl. 260—314.5)

This invention relates to a process for the production of highly halogenated copper phthalocyanines containing 14 or more, and preferably 16 halogen atoms per molecule; "halogen" as used in this specification and in the appended claims means chlorine or bromine, chlorine being preferred.

Up to the present, highly chlorinated copper phthalocyanine compounds, particularly hexadecachlorocopper phthalocyanine, have been produced by heating tetrachlorophthalic acid anhydride with copper-(I) and/or copper-(II) salts, preferably, with copper-(II)-chloride or -bromide in the presence of a nitrogen donator such as urea and a catalyst such as titanium or zirconium tetrachloride, or by chlorinating copper phthalocyanine with elementary chlorine. Both methods, however, have disadvantages. The former process produces inferior yields of impure pigments, since the residues of titanium or zirconium oxide hydrates arising from the use of titanium or zirconium compounds cannot be completely removed from the end product; moreover the reaction is of very long duration and the process is difficult to repeat with constant yields and qualities of the end products. Direct chlorination of copper phthalocyanine necessitates high temperatures, the use of catalysts which are sensitive to moisture such as aluminium chloride, and apparatus which is stable to corrosion and, therefore, expensive. Also, the efficiency of this process is greatly reduced by the relatively long reaction times.

It is, therefore, an object of the present invention to provide a process for the production of halogenated copper phthalocyanines containing 14 or more, and preferably 16 chlorine and/or bromine atoms per molecule, which process is free from the above-named drawbacks.

It is more particularly an object of the invention to provide a process for the above-stated purpose, in which tetrachloro-phthalo-dinitrile can be used as starting material, thus avoiding the necessity of providing for the presence of a nitrogen donator in the reaction.

These objects are attained by the process according to the invention whereby highly halogenated copper phthalocyanine, i.e., copper phthalocyanine containing at least 14 halogen atoms per molecule and, in particular hexadecachlorocopper phthalocyanine, is produced in large batches and high yields, in pure form and in a relatively short-time reaction, from tetrahalogeno-phthalo-dinitriles, and especially from tetrachlorophthalo-dinitrile.

This process comprises heating to 160–260° C., 4 moles of tetrahalogeno-phthalo-dinitrile with a "copper donator," as defined below, in sufficient amount to set free one mole of copper, in the presence of at least 0.25 mole of ammonia or a corresponding amount of an "ammonia-donator" as defined hereinafter, as catalyst. The reaction is preferably performed with tetrachloro-phthalo-dinitrile in high boiling organaic inert solvents.

The term "copper donator" as used in this specification and in the appended claims to describe suitable compounds which are capable of setting free copper under the above reaction conditions, means copper oxides, copper-(I) and copper-(II) salts of organic and inorganic acids, namely, copper acetate, sulfate, nitrate, copper tetrammine-complexes and, in particular, copper-(I)- and copper-(II)-chlorides and bromides. Copper-(I) and, in particular copper-(II) chloride and copper-(II) oxide are preferred, as the best yields and purest end products are obtained with these compounds. When using copper-(I) bromide instead of copper-(II) chloride, some of the chlorine atoms in the end product are replaced by bromine atoms. The copper compounds are used preferably in an excess of 20 to 30% by weight over the stoichiometrically required amount to be reacted.

The term "ammonia-donator" as used in this specification and in the appended claims means first of all, urea, ammonium carbamate and ammonium hydrogen carbonate, but also ammonium chloride, ammonium bromide, ammonium sulfate, ammonium nitrate and ammonium carbonate, guanidine and its water-soluble salts with acids, cyanamide, dicyanodiamide and biuret. The best results with regard to yield and purity of the end products are obtained when using urea, ammonium carbamate or ammonium hydrogen carbonate as ammonia-donator. When using ammonium bromide as ammonia-donator, the end product contains some bromine atoms in lieu of chlorine atoms (up to about 3% by weight based on the weight of the end product). Preferably, ammonia or ammonia-donators are used in amounts of 1 to 2 moles per atom of copper or mole of copper compound.

Ammonia or ammonia-donators serve as catalysts in the process according to the invention and not as nitrogen-donators, the presence of the latter being superfluous when using a phthalo-dinitrile as starting material.

The advantageous catalytic influence of ammonia or ammonia-donators in the process of the invention is particularly unexpected, since an excess of ammonia has hitherto been recommended in the synthesis of unhalogenated copper phthalocyanines from unsubstituted or mono- or di-chloronated phthalo-dinitriles in order to suppress the presence of chlorine in the end product (British Patent 559,247 to American Cyanamid Company), contrary to the results normally obtained with copper halides, when no ammonia is present. In this known process, the ammonia is said to act as a combined reducing agent and anionic acceptor.

In the process according to this invention, ammonia acts neither as reducing agent nor as anionic acceptor, but as catalyst for permitting production of highly halogenated copper phthalocyanines with satisfactory yields, in an acceptable reaction time, with a lower amount of copper salt and at lower temperature.

Thus, when reacting tetrachloro-phthalo-dinitrile with cupric chloride at 200 to 205° in nitrobenzene, as inert solvent, no reaction takes place, while the presence of a small amount of ammonia, introduced, preferably, in the form of urea as donator, affords yields of 76 to 86%, depending on the amount of ammonia provided in the reaction.

Mono- and di-halogenated phthalo-dinitriles have been reacted with metal powders or metal chlorides to form the corresponding tetra- or octo-halogenated metal phthalocyanines, using ammonium molybdates or vanadates as catalysts. These catalysts used alone in the corresponding reactions with tetrahalogenated phthalo-dinitrile fail or lead only to inferior yields, in particular with cuprous chloride as copper donator.

Used in combination with an ammonia donator such as is required in the process according to the invention, they do not afford any higher yields than when the ammonia-donator is used alone. In some cases, even a lesser yield has been noted when adding a molybdate type catalyst to the urea catalyst in the process according to the invention.

The process according to the invention is performed by heating the mixture of the reactants, preferably, in an inert high boiling solvent as it is thus possible to maintain better control of the reaction and purer end products are obtained. Examples of suitable solvents are aromatic hydrocarbons such as naphthalene or methyl naphthalenes or halogenated and/or nitrated aromatic hydrocarbons, particularly di- and tri-chlorobenzenes or 1-chloronaphthalene or nitrobenzene or mixtures of these compounds. Nitrobenzene is preferred.

The best yields and purest end products are obtained by reacting 4 moles of tetrachloro-phthalo-dinitrile with about 1.3 moles of copper-(II)-chloride or copper-(II)-oxide and 0.5 to 2 moles of ammonium hydrogen carbonate, ammonium carbamate, ammonium chloride or, preferably, urea, in nitrobenzene as solvent.

The highly halogenated copper phthalocyanines are isolated by distilling off the solvent or by filtration. They are purified by acid and alkaline extraction.

The end products are converted into pigment form by the usual methods, e.g., by dissolving and recrystallizing these products in sulfuric acid, oleum or chlorosulfonic acid or in mixtures of these acids, or by milling the end products with inorganic or organic water soluble salts, in particular with calcium chloride, optionally in the presence of organic solvents, preferably high boiling petroleum fractions.

The highly chlorinated copper phthalocyanines obtained according to the invention which have been conditioned by milling with salts have greater color strength than the commercially available highly chlorinated copper phthalocyanine pigments obtained by chlorination of copper phthalocyanine.

The following examples illustrate the invention. The temperatures are given therein in degrees centigrade. Percentages are by weight unless expressly stated otherwise.

*Example 1*

42.6 grams (g.) tetrachloro-phthalo-dinitrile, 6.45 g. of anhydrous copper-(II) chloride and 0.72 g. of urea in 300 g. of nitrobenzene are heated for 3 hours at 200–205° while stirring. The thick, green suspension is filtered off hot and the residue is washed with hot nitrobenzene and with dimethyl formamide. The residue is stirred for 30 minutes at 80° in aqueous 3%-nitric acid, then filtered off, washed with water and diluted ammonia and dried at 100°.

34.2 g. corresponding to 76.5% of the theoretical, of a crystalline, green copper phthalocyanine is obtained which contains 49.8% of chlorine.

By using, with otherwise the same procedure as given in this example, 1.44 g. or 2.88 g. of urea instead of the 0.72 g. used above, 37.5 or 39 g., respectively, of the same chlorinated copper phthalocyanine are obtained. The yields correspond to 83.2 or 86.6%, respectively, of the theoretical.

Under the same conditions but without addition of urea, no chlorinated copper phthalocyanine at all is produced.

By using, with otherwise the same procedure as given in this example, 2.88 g. of urea and 300 g. of trichlorobenzene instead of 300 g. of nitrobenzene, 24 g., corresponding to 54.3% of the theoretical, of chlorinated copper phthalocyanine are obtained.

*Example 2*

10.65 g. of tetrachloro-phthalo-dinitrile and 1.75 g. of copper-(II) chloride in 120 g. of nitrobenzene are heated while stirring at 200° while introducing dry ammonia gas. The suspension is then further stirred for 3 hours at 200–205° while introducing 5 g. of dry ammonia gas. The chlorinated copper phthalocyanine formed is isolated and dried as described in Example 1.

8.2 g. of a green copper phthalocyanine, corresponding to 73% of the theoretical, are obtained.

*Example 3*

10.65 g. of tetrachloro-phthalo-dinitrile, 1.75 g. of copper-(II) chloride, 0.78 g. of urea and 0.05 g. of ammonium molybdate in 120 g. of nitrobenzene are heated for 1 hour at 170° while stirring. The green, chlorinated copper phthalocyanine formed is isolated and dried as described in Example 1. It weighs 6.9 g., corresponding to 61% of the theoretical, i.e., considerably less than was achieved with a smaller amount of urea as the sole catalyst, in Example 1.

*Example 4*

10.65 g. of tetrachloro-phthalo-dinitrile, 1.86 g. of copper-(I) bromide and 2.06 g. of ammonium hydrogen carbonate in 120 g. of nitrobenzene are heated for 3 hours at 200–205° while stirring. The green copper phthalocyanine formed is isolated and dried as described in Example 1. It weighs 10.2 g., corresponding to 90.5% of the theoretical, and contains 2.2% of bromine and 47.45% of chlorine.

*Example 5*

10.65 g. of tetrachloro-phthalo-dinitrile, 1.75 g. of copper-(II) chloride and 1.27 g. of ammonium bromide are heated in 120 g. of nitrobenzene for 3 hours at 200–205° while stirring. The green copper phthalocyanine formed is isolated and dried as described in Example 1. It weighs 9.2 g., corresponding to 81.5% of the theoretical, and contains 48% of chlorine and 1.7% of bromine.

In the following table, the yields of highly chlorinated copper phthalocyanine are given which are obtained if the procedure given in Example 5 is followed using the amounts given of copper compound and substances giving off ammonia:

| No. | Copper donor | Ammonia donor | Yield = percent of theoretical |
|---|---|---|---|
| 6 | 1.03 g. CuO | 0.78 g. urea | 10.4 g. = 92.5. |
| 7 | 2.36 g. anhydrous Cu(CH$_3$COO)$_2$ | do | 10 g. = 89. |
| 8 | 3.14 g. Cu(NO$_2$)$_3$·3H$_2$O | do | 5.1 g. = 45. |
| 9 | 1.3 g. Cu$_2$Cl$_2$ | do | 8 g. = 71.2. |
| 10 | 1.75 g. CuCl$_2$ | 0.7 g. ammonium chloride | 8 g. = 71.2. |
| 11 | 1.75 g. CuCl$_2$ | 1.4 g. ammonium chloride | 9.2 g. = 82. |
| 12 | 1.75 g. CuCl$_2$ | 1.72 g. ammonium sulfate | 6.5 g. = 57.8. |
| 13 | 1.75 g. CuCl$_2$ | 1.24 g. guanidine hydrochloride | 8 g. = 71.2. |
| 14 | 1.75 g. CuCl$_2$ | 1.08 g. dicyanodiamide | 6.3 g. = 56. |
| 15 | 1.75 g. CuCl$_2$ | 2.34 g. guanidine carbonate | 8.5 g. = 75.5. |
| 16 | 1.75 g. CuCl$_2$ | 2.04 g. ammonium carbonate | 8.7 g. = 77. |
| 17 | 1.75 g. CuCl$_2$ | 1.03 g. ammonium hydrogen carbonate | 9.4 g. = 83.5. |
| 18 | 1.75 g. CuCl$_2$ | 2.06 g. ammonium hydrogen carbonate | 9.7 g. = 86. |
| 19 | 1.62 g. CuCl$_2$ | 1.88 g. ammonium carbamate | 9.4 g. = 83.5. |

I claim:

1. A process for the production of highly halogenated copper phthalocyanines, comprising heating to 160–260° C., tetrahalogeno-phthalo-dinitrile with a copper donator in sufficient amount for setting free at least one gram atom of copper for every 4 moles of the said dinitrile, in the presence of at least 0.25 mole of ammonia introduced as a member selected from the group consisting of ammonia and an ammonia donator, and recovering the resulting highly halogenated copper phthalocyanines from the reaction mixture.

2. A process as described in claim 1, wherein the said dinitrile is tetrachlorophthalodinitrile.

3. A process as described in claim 1, wherein the reaction partners are heated to 180–220° C.

4. A process as defined in claim 1, wherein the copper donator is copper(II)-chloride.

5. A process as defined in claim 1, wherein the copper donator is copper(II)-oxide.

6. A process as defined in claim 1, wherein the ammonia donator is urea.

7. A process as defined in claim 1, wherein the ammonia donator is ammonium carbamate.

8. A process for the production of highly halogenated copper phthalocyanines, comprising heating to 160–260° C., tetrahalogeno-phthalo-dinitrile with a copper donator in sufficient amount for setting free at least one gram atom of copper for every 4 moles of the said dinitrile, in the presence of at least 0.25 mole of ammonia introduced as a member selected from the group consisting of ammonia and an ammonia donator, in an inert high-boiling aromatic solvent, and recovering the resulting highly halogenated copper phthalocyanines from the reaction mixture.

9. A process as described in claim 8, wherein the said solvent is nitrobenzene.

10. A process for the production of highly halogenated copper phthalocyanines, comprising heating to 160 to 260° C., tetrachloro-phthalo-dinitrile with copper(II)-chloride in sufficient amount to set free at least one gram atom of copper for every 4 moles of the said dinitrile, in the presence of at least 0.25 mole of ammonia introduced in the form of urea, and of nitrobenzene as solvent, and recovering the resulting highly chlorinated copper phthalocyanines from the reaction mixture.

11. In the production of highly halogenated copper phthalocyanine from tetrahalogeno-phthalo-dinitrile and a copper donator, the improvement consisting essentially of adding to the reaction mixture of said dinitrile and said copper donator, an ammonia donator in sufficient amount to set free at least about 0.25 mole of ammonia for every 4 moles of said dinitrile.

12. In the production of highly halogenated copper phthalocyanine from tetrahalogeno-phthalo-dinitrile and a copper donator, the improvement consisting essentially of adding to the reaction mixture of said dinitrile and said copper donator at least about 0.25 mole of ammonia for every 4 moles of said dinitrile.

No references cited.

JOHN D. RANDOLPH, *Primary Examiner.*

J. A. PATTEN, *Assistant Examiner.*